P. W. PRATT.
Furniture-Pads.
No. 204,913. Patented June 18, 1878.
Fig.1. Fig.2.
 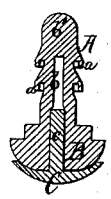
Fig.3. Fig.4.
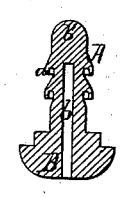 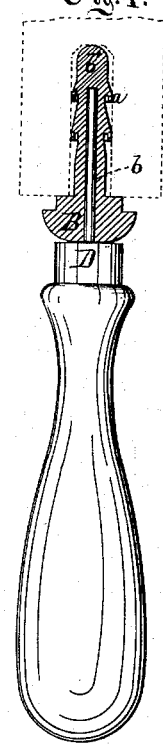
Witnesses:
Theodore L. Foster
B. S. Clark
Inventor:
Philip W. Pratt
By Fitch & Fitch
Attys.

UNITED STATES PATENT OFFICE.

PHILIP W. PRATT, OF ABINGTON, MASSACHUSETTS.

IMPROVEMENT IN FURNITURE-PADS.

Specification forming part of Letters Patent No. 204,913, dated June 18, 1878; application filed November 24, 1877.

*To all whom it may concern:*

Be it known that I, PHILIP W. PRATT, of Abington, county of Plymouth, in the State of Massachusetts, am the inventor of Improvements in Buffers for Chair-Leg Ends and similar purposes, of which the following is a full, clear, and exact description, reference being had to the accompanying drawings, forming part of this specification.

My invention relates to an elastic buffer or cushion adapted to be secured upon the end of a chair-leg, or other such similar place, as a crutch or cane, by means of a stem passed into an opening in the end of the leg or stick; and it consists in a recess or opening formed in and extending through the buffer-head and into and longitudinally nearly through the body of the elastic stem, whereby the stem may be readily seated in the opening in the end of the chair-leg or other stick, and whereby a metal cap or wearing-surface may be readily fixed upon the exterior of the buffer-head, by means of a metal stem attached thereto, inserted in the said opening, all as described.

Figure 1 is an elevation of a buffer and elastic stem embodying my improvement, and showing the metal cap or bearing surface in proper position on the buffer-head. Fig. 2 is a vertical central sectional view of the same. Fig. 3 is a similar view of the buffer and elastic stem, showing the longitudinal recess; and Fig. 4 is a similar view of the same, showing the stem in the operation of being introduced into or seated in the opening in the end of the chair-leg.

A is the elastic buffer-stem, and B is the buffer-head. I am accustomed to cast or mold these parts in one piece of india-rubber. To enable the stem to hold securely in its seat in the opening in the end of a chair-leg or other stick, it is necessary that the stem should, when in its normal condition, be of a somewhat greater diameter than the diameter of said seat-opening, so that when the stem is placed in its said seat it will fill said opening entirely, and its tendency to expand still farther will cause it to press tightly throughout its surface against the walls of said opening; or the stem may be furnished with the flanges shown in the drawings at $a$, or with circumferential corrugations, or it may be made with a greater diameter at its point than at its junction with the head B. I have found it very inconvenient to insert such an elastic stem, as above described, into the proper seat or opening in the end of a chair-leg or other stick, and one object of my invention is to obviate this difficulty.

In and extending through the head B I form a central recess or aperture, $b$, which also extends into and longitudinally nearly through the body of the stem A, as shown. There is thus left or formed the solid end or point $b'$ of the stem A. When it is desired to introduce the stem into its seat, a blunt instrument or awl, such as shown at D, is passed into the opening $b$ until its blunt extremity rests against the end $b'$ on the interior of the recess. The end of the stem is now introduced into the opening in the leg or stick, and, force being exerted on the awl D, the end $b'$ is carried forward, and the stem, by its elasticity, is elongated, and its diameter throughout consequently reduced, so that it passes easily to its place in the seat-opening. The awl being withdrawn, the stem, thus released, shortens by its elasticity, and its diameter is thus increased until it entirely fills the opening and becomes securely seated.

When the stem is thus seated, the opening $b$ serves to receive the rigid stem $c$ of the metal cap or wearing-face C. This cap is made to conform on its interior face to the shape of the end of the head B, upon which it is to be imposed, while its exterior face is preferably smooth and rounded off, as shown. The stem $c$ may be threaded and screwed into the opening $b$, or may be smooth, and, being of a somewhat greater diameter than the opening, may be easily crowded into said opening. This metal cap serves to permit the chair-leg to move freely over any surface, while at the same time the wear on the buffer-head is prevented, and the elastic effect of the buffer is preserved.

What I claim as my invention, and desire to secure by Letters Patent, is—

1. In a buffer-stem, A, the recess $b$, extending through the head B, and longitudinally into the body of the stem, together with the solid extremity or point $b'$, as described, and for the purposes specified.

2. A furniture-buffer provided with the stem A, head B, solid point $b'$, and longitudinal recess $b$, in combination with the cap C and its rigid stem $c$, arranged to operate as and for the purpose specified.

3. In combination, as a furniture-buffer, the elastic head B and its elastic stem A, fabricated in one piece, together with the metal cap C, arranged to operate as and for the purpose described.

PHILIP W. PRATT.

Witnesses:
A. S. FITCH,
M. F. CLIFTON.